F. P. GORIN.
TABULATING ATTACHMENT FOR TYPE WRITING MACHINES.
APPLICATION FILED JULY 18, 1917.

1,264,292.

Patented Apr. 30, 1918.
6 SHEETS—SHEET 5.

Inventor
F. P. Gorin
By
his Attorney

F. P. GORIN.
TABULATING ATTACHMENT FOR TYPE WRITING MACHINES.
APPLICATION FILED JULY 18, 1917.

1,264,292.

Patented Apr. 30, 1918.
6 SHEETS—SHEET 6.

Inventor
F. P. Gorin
By
His Attorney

UNITED STATES PATENT OFFICE.

FRED P. GORIN, OF SEATTLE, WASHINGTON.

TABULATING ATTACHMENT FOR TYPE-WRITING MACHINES.

1,264,292.    Specification of Letters Patent.    Patented Apr. 30, 1918.

Application filed July 18, 1917. Serial No. 181,417.

*To all whom it may concern:*

Be it known that I, FRED P. GORIN, a citizen of the United States of America, residing at Seattle, in the county of King and State of Washington, have invented certain new and useful Improvements in Tabulating Attachments for Type-Writing Machines, of which the following is a specification.

This invention relates to improvements in tabulating attachments for typewriter machines.

Heretofore it has been necessary to reconstruct the usual tabulating mechanism to such extent as to almost amount to a reorganization of the machine, in order to effectively cushion the impact of the tabulator stops, and provide safety devices to insure the reconnection of the typewriter letter feed at the predetermined writing point.

One of the principal objects of this invention is to provide cushioning means and safety devices in the form of a compact unit readily and quickly detachable and attachable to any usual form of tabulating typewriter without the necessity of cutting, drilling, tapping or in any other manner altering the tabulating mechanism, or interfering with its usual function; the attachment taking complete control of the carriage after the usual tabulating operation has been completed and all the tabulating mechanism, as well as the typewriter escapement, has been returned to normal relation; the attachment automatically maintaining complete control of the carriage until it settles at the predetermined writing point.

Another object of the invention is to render it unnecessary to employ such a relatively strong buffer as has been common in the art heretofore, it being manifest that the weaker the buffer be, the shorter will be the time required for the carriage to recover from the vibration caused by the buffer, the lighter buffer also greatly reducing the shock and noise.

In lieu of having the moving parts act on a buffer which must overcome the tension of the usual motor spring, I provide buffer means which act independently or the typewriter motor spring, and while this means is performing its function, means are provided for locking out the motor spring, which renders same inactive during the buffer period, so far as movement of the carriage is concerned.

In carrying out my invention I employ the buffer principle for the carriage, when the usual stops collide, such for instance as disclosed in the patents to Frantz No. 1124219, 1118338 and 1118339, but have materially improved the construction and resultant function flowing therefrom.

A further object of the invention is to provide automatic means for effectually locking the parts at the time the carriage is compressing the buffer, and the consequent expansion of said buffer, and locking means to take care of the carriage after the compression and expansion of the buffer is completed, one locking means acting to control the carriage after it passes the writing point when traveling in letter feed direction, and the other locking means acting to control the carriage after it passes the writing point when traveling in contra letter feed direction.

A further object of the invention is to provide automatic means for positively locking the parts until the carriage returns to a predetermined position irrespective of whether or not the operator holds the tabulating key depressed after the predetermined writing point be reached the mechanism being so arranged that the carriage is permitted to vibrate within a letter space just prior to its finding its predetermined position, but even when this movement occurs the lock remains in locked out position.

The invention also aims to provide in a tabulating attachment for typewriters, means which does not require the locking out of the tabulator mechanism during the period of vibration of the carriage when the buffing action occurs, as I have found it is only necessary to lock the carriage tabulator stop against movement in either direction in excess of a letter space, with respect to the frame of the typewriter, thereby leaving the tabulator and the typewriter escapement free at any time, after the impact, to return to normal position upon removal of the finger pressure from the tabulator key.

In the accompanying drawings, the numeral 1 indicates conventionally a typewriter; 2 the carriage; 3 the usual escapement bar, and 4 the escapement. The typewriter is provided with a tabulator 5, of any preferred construction, and includes stops 6, operated by appropriate keys 7.

These parts are of usual construction and are designated solely for the purpose of illustrating the application of my invention.

Extending from the rear and secured to the carriage 2, are brackets 8, and 9, which support the tabulator attachment, which makes it possible to stop the carriage at a predetermined writing point when using the ordinary tabulator, herein conventionally shown. Mounted in the brackets 8, and 9, is a stop bar 10, provided with a plurality of teeth 11, the carriage having a limited movement on the stop bar, as will be explained later on. Depending from one end of the stop bar is a projection 12, to which the outer end of the usual carriage motor spring 13, of the typewriter is attached. Extending from the front of the stop bar 10, is a pin 14, and attached thereto is a light spring 15, the opposite end being secured to the bracket 8. Carriage stops 16, are transversely slidably mounted on the stop bar 10, and they are held in adjusted position by the teeth 11, these stops of course being located where it is desirable to stop the carriage at a predetermined writing point when tabulating.

Secured on the stop bar 10, beyond the bracket 9, is a bracket 17, and at the opposite end of the bar 10, beyond the bracket 8, is a bracket 18. In the brackets 17, and 18, are alined screws 19, having cone seats in which the cone shaped ends of a lock rod 20, are mounted. Slidably mounted on the lock rod, adjacent the brackets 8, 18, is a locking sleeve 21, formed with a longitudinal slot 22, provided with an enlargement 23, at its inner end. A pin or screw 24, extends from the lock rod, and engages the enlargement 23 of the slot, the screw insuring the rotation of the sleeve with the rod. Between the outer ends of the sleeve and the bracket 18, is interposed a light spring 25, which normally tends to slide the sleeve toward the bracket 8, hence the inner end wall of the slot 22, into contact with the interlocking screw 24.

Figure 1:
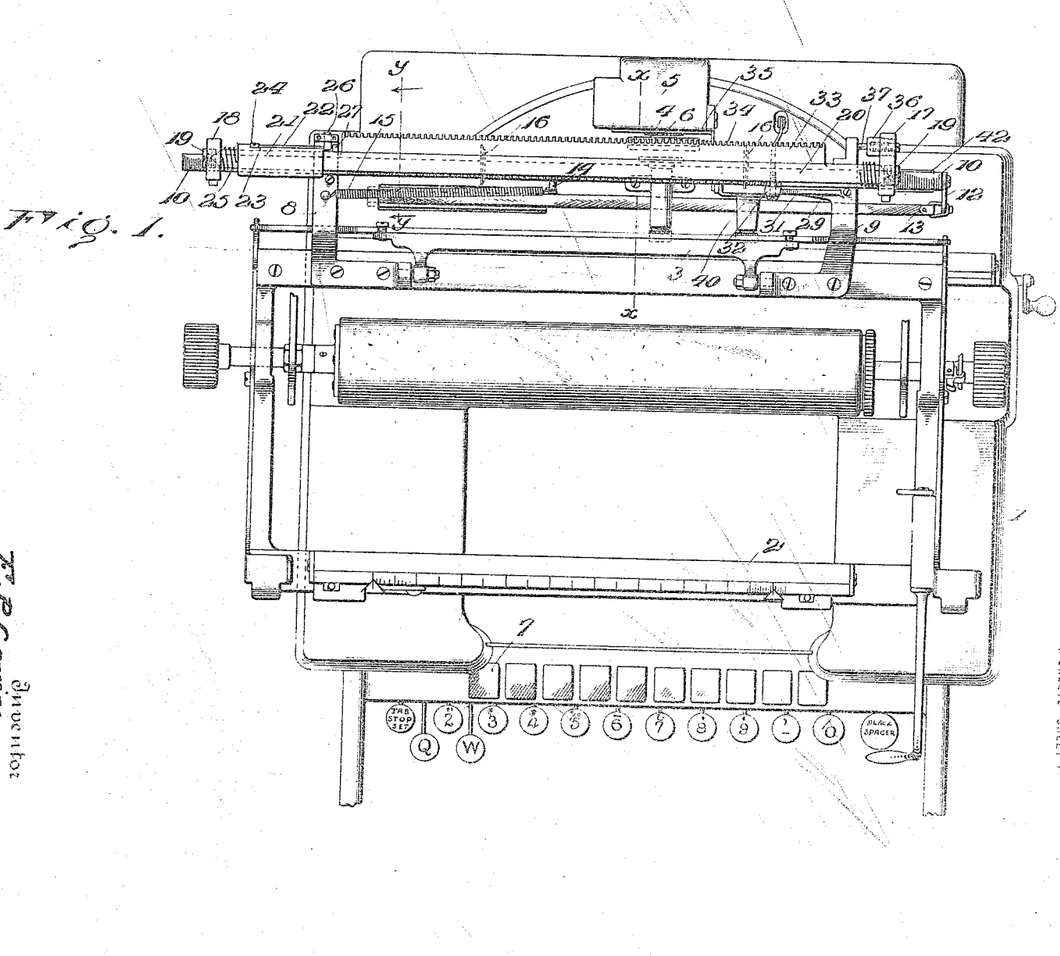
Figure 1 is a plan view of a typewriter illustrating the application of the improved tabulator attachment.
Figure 2:
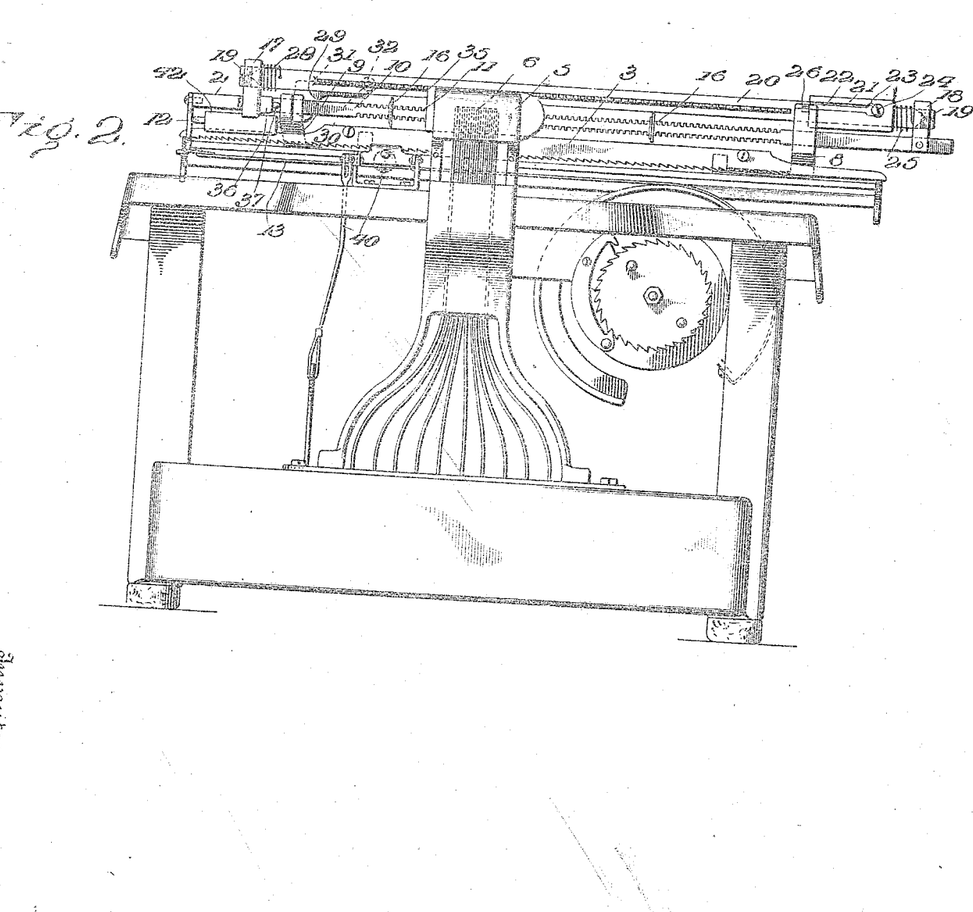
Fig. 2, is a rear elevation of the same.
Figure 3:
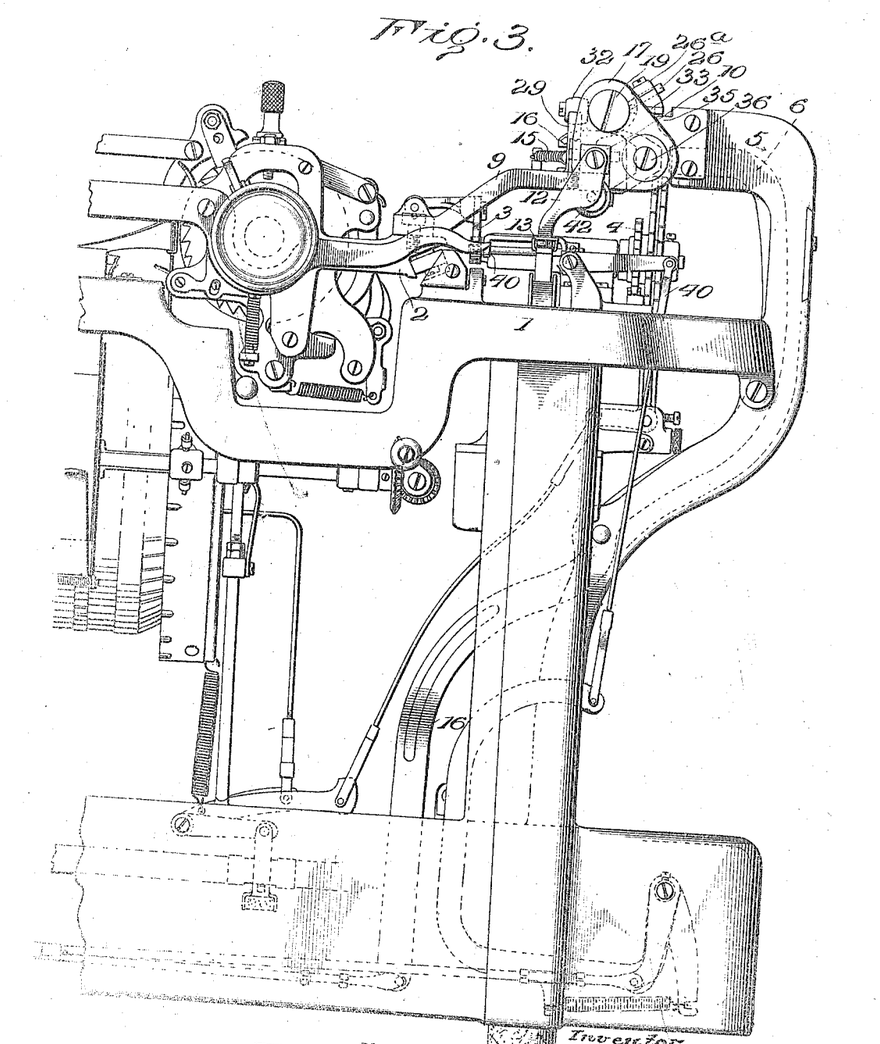
Fig. 3, is a side elevation, the parts being in the same position as shown in Figs. 1 and 2.
Figure 4:
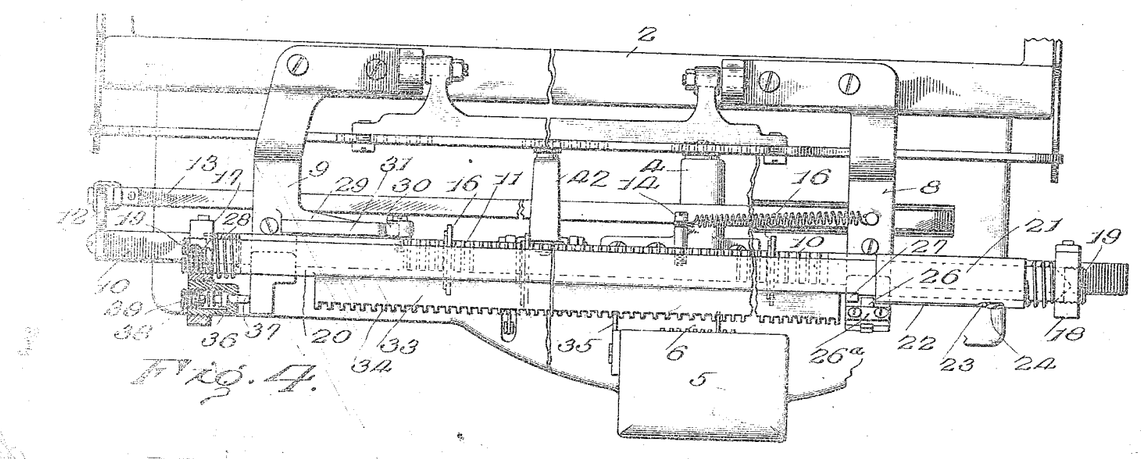
Fig. 4 is an enlarged detail plan view of the tabulator attachment.
Figure 5:
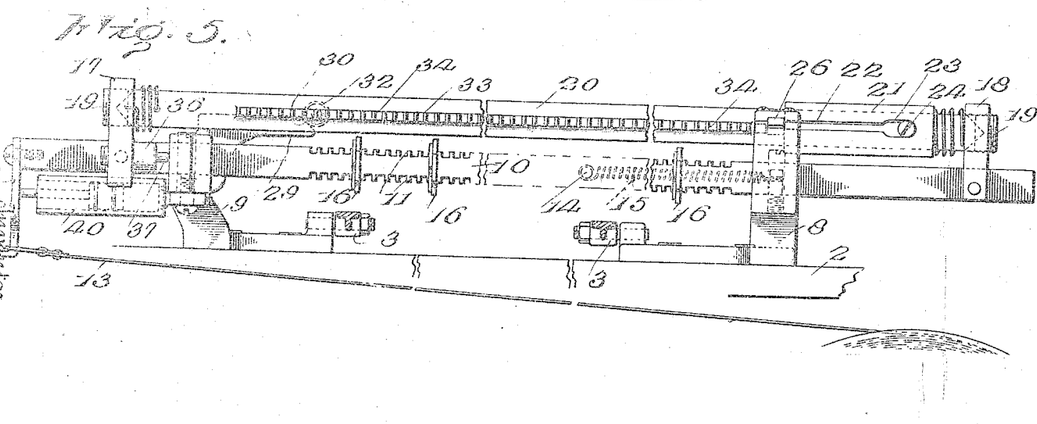
Fig. 5 is an enlarged retail rear view of same.
Figures 6, 7, 8, 9:
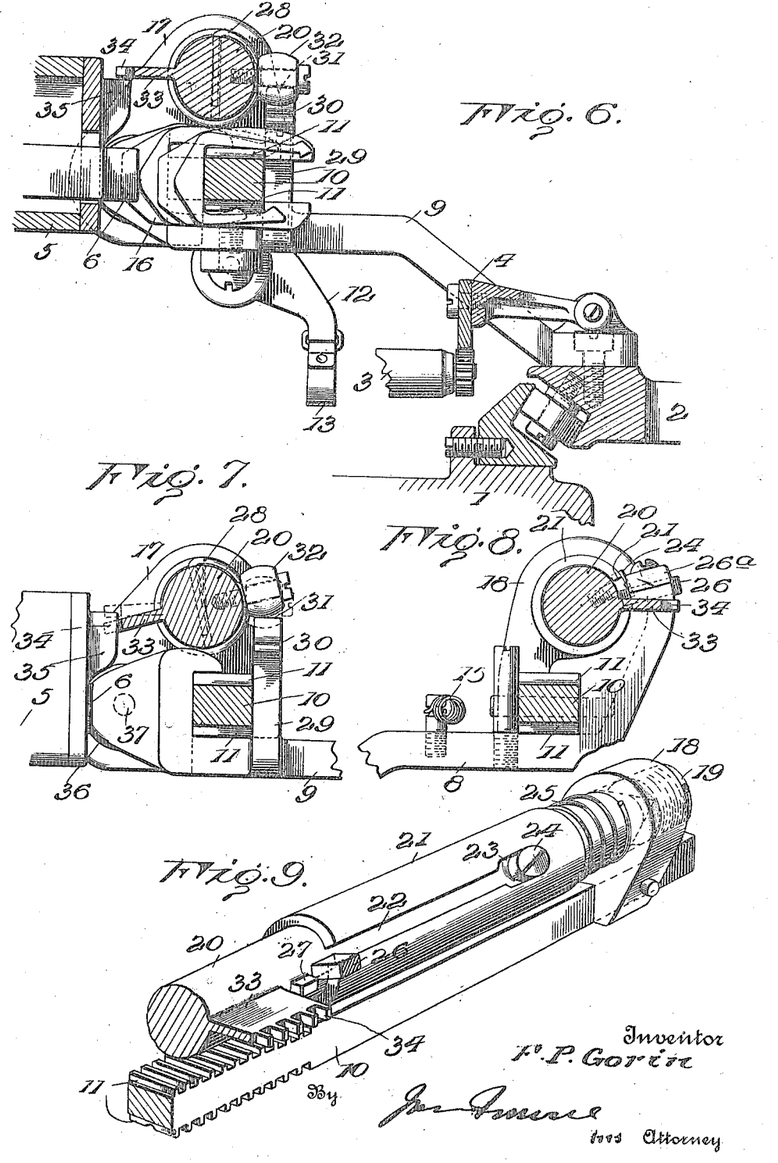
Fig. 6 is a detail vertical section taken on the line $x$—$x$ of Fig. 1.
Fig. 7 is a similar view, but illustrating the lock rod in rocked position to lock the parts to the frame of the typewriter.
Fig. 8 is a similar section taken on the line $y$—$y$ of Fig. 1, looking in the direction of the arrow.
Fig. 9 is a detail rear perspective view of the lock rod, the stop bar, and associated parts.
Figure 10:
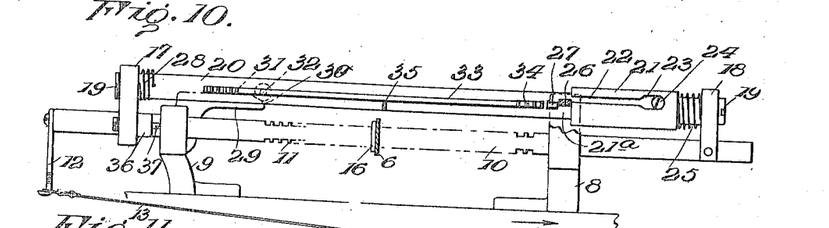
Fig. 10 is a diagrammatic rear elevation of the attachment and the typewriter carriage, the parts being shown in normal position.

Projecting from the bracket 8, toward the lock rod is a lug 26, which is normally disposed to lie against the inner edge of the sleeve 21, with its upper edge approximately in the plane with the lower wall of the slot 22. The lug 26, is clamped in adjusted position by a cap plate 26$^a$, screwed to the upper end of the bracket 8. Extending from the lock rod is a projection 27, spaced from the inner edge of the sleeve 21, to form a seat 21$^a$, the width of the seat being equal to the width of the lug 26, the latter, when the parts are in their normal positions being confined in the seat between the projection and the outer end of the sleeve as shown best in Fig. 10. The upper surface of the projection 27, is below the upper surface of the lug 26, the two surfaces being normally spaced apart about one half the thickness of the lug to form a stepped escapement in the operation of the tabulator attachment. To the opposite end of the lock rod 20, is secured one end of a coil spring 28, its opposite end being fastened to the bracket 9, and is tensioned to normally rotate the rod to bring the lug 26, and the projection 27, into the relation previously described. Projecting inwardly from the bracket 9, is an extension 29, the inner upper end of which is beveled to provide a cam 30, while the top portion forms a track 31, for a roller 32, supported on a pin which extends from the front of the lock rod. The roller normally engages the cam, as indicated in Fig. 10, the spring 28, acting to rotate the rod to effect this relation.

On a rib 33, at the rear of the lock rod are formed teeth 34, with which a tooth 35, fixed on the typewriter frame coöperates to hold the bar against longitudinal movement when the attachment is in use.

In the bracket 17, is screwed a bushing 36, and projecting through an opening in the end thereof is a headed pin 37, which projects beyond the inner end of the bushing a distance less than a letter space, and is located in the path of movement of the bracket 9 to be struck thereby upon the rebound of the carriage when repelled by the cushion 25. A small spring 38, is confined between the head of the pin 37, and a screw 39 fitted in the outer end of the bushing, the spring normally projecting the pin. This construction serves as a cushion as well as a means to return the carriage to the predetermined writing point when it is repelled beyond said point by the buffer spring.

The inner end of the bushing 36, is so positioned that when the spring pressed pin is driven in, by the bracket 9 the bushing forms a positive stop and limits the movement of the carriage.

It is of course to be understood that in all tabulating typewriters the usual letter feed is disconnected from the carriage by operating a tabulating key to bring the stops to impact position, and therefore there is usually a connection, such for instance as illustrated at 40, which is common to all the tabulating keys 7, so that upon the depression of any one of the keys, the escapement bar 3, will be elevated to permit free movement of the carriage under the influence of the motor spring.

Projecting from the bracket 9, is a dash pot and plunger 42 the latter acting on the projection 12, when the carriage is repelled by the buffer spring, to reduce possible shock, should the carriage contact with the positive stop.

In describing the operation, reference is made particularly to Figs. 10 to 13, which, represent diametrically rear views of the operating parts of the safety mechanisms, and for clearness the movements of the carriage will be referred to as "right" and "left," viewing the machine from the rear.

When it is desired to tabulate, the desired carriage stop 16, on the stop bar 10, is of course positioned to coöperate with the tabulating stop, then the appropriate tabulating key 7 is depressed in the usual manner, which, through the connections, projects one of the tabulating stops 6, into the path of the carriage stop.

Figure 11:
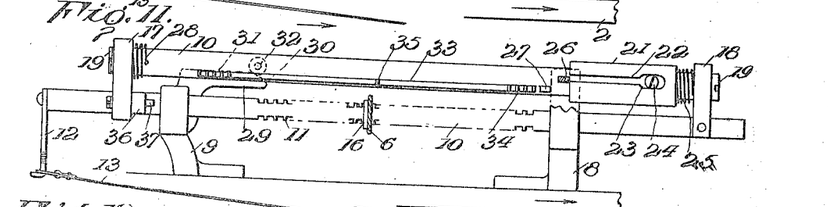
Fig. 11, is a similar view, the stops having collided and the carriage having moved by momentum to lock the lock rod and stop to the typewriter frame.
Figure 12:
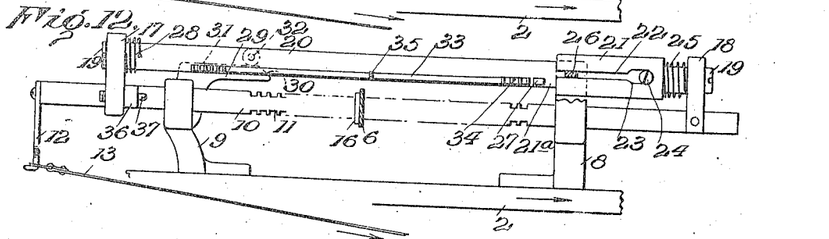
Fig. 12 is a similar view, but showing the sleeve released, and the carriage at the end of its momentum movement.

Immediately the tabulator key is depressed the escapement bar 3 is disengaged from the letter feed, and the carriage is free to move under the influence of the motor spring 13, until the carriage stop 16, collides with the tabulator stop 6, as shown in Fig. 10. When the impact occurs, the momentum of the shock slides the carriage on the stop rod, to the right of the predetermined letter point, as viewed from the rear of the machine, and notwithstanding the fact that the stop bar is mounted on the carriage, said bar will now be held rigid from the time of the impact, until the carriage is ultimately located at the predetermined writing point. In the movement of the carriage toward the right, after the stops collide, the lug 26, on the bracket 8, slides the sleeve 21, on the lock rod 20, the approximate distance of the enlarged portion 23, and against the tension of the spring 25, as shown in Fig. 11. During the period the lug is laterally pressing on the sleeve, the cam 30, is forced under the roller 32, which rocks the lock rod 20, and the sleeve, and the slot 22 is presented in registry with the lug. When the cam rocks the lock rod, one of the spaces between two of the teeth 34, engages the tooth 35, and locks the lock rod 20 and the stop bar 10, to the frame of the machine, the roller 32, being now supported on the track 31, which acts to hold the parts in locked relation. Instantly the lug 26, is engaged in the slot, the spring 25, restores the sleeve to its normal position, although the carriage may still continue to move toward the right, as shown in Fig. 12; the duration of this movement being dependent entirely upon the length of the run of the carriage and the momentum incident to the blow when the stops collide. From the time the stops collide to the end of its movement toward the right, the buffer spring is tensioned inasmuch as its forward end is fastened to the carriage, while its opposite end is fixed to the stop bar, which is now held stationary.

It follows, from the foregoing description, that the sleeve and the buffer spring act together to absorb the shock when the impact takes place, but immediately after the cam tilts the lock rod, the buffing action of the sleeve ceases and the carriage is thereafter cushioned by the buffer spring alone, and as the stop bar is now locked to the frame the motor spring is prevented from performing any function on the carriage proper.

The purpose of tilting the rod is to engage the fixed tooth 35, between two teeth on the rib 33, to lock the parts in position pending the ultimate locating of the carriage at the predetermined writing point. As the lock rod is mounted on the lock bar, and as the latter is held stationary momentarily by the stops and subsequently fixed to the frame of the typewriter, said lock rod cannot now move with the carriage.

When the momentum of the carriage toward the right has been absorbed by the cushion, it is promptly repelled, and in its rebound movement in contra letter feed direction, it might be that the lug 26, would stop in its normal position and drop into the seat 21ª formed between the end of the sleeve 21, and the projection 27, or the rebound movement would be such that said lug would pass the seat 21ª, and it is at this point the danger of overriding the predetermined writing point is likely to occur, a condition with which this invention successfully copes.

Figure 13:
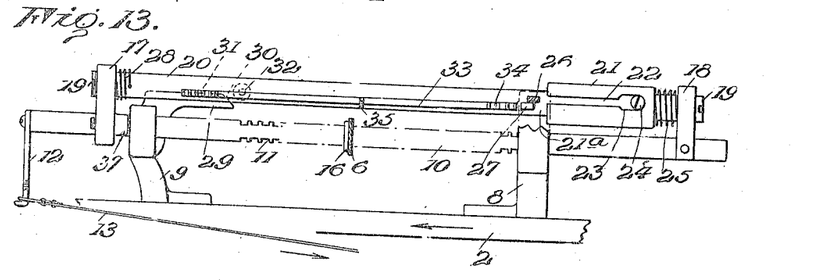
Fig. 13, is a similar view showing the carriage against its fixed stop when rebounded by the buffer.

When the carriage rebounds beyond the predetermined writing point in contra letter feed direction the lug 26 will, under ordinary circumstances travel past the seat 21ª, as shown in Fig. 13, and in the arcuate path of movement of the projection 27. As the top surface of the projection 27 is below the bottom surface of the lug 26, it follows that when the spring 28, rocks the lock rod in direction of its normal position, the projection 27, will have ample time to pass over the seat 21ª, without liability of striking said lug. Instantly the lug 26, leaves the slot 22, the lock rod 20, commences to rock, but its movement is arrested by the collision of the projection 27 and the lug 26, as shown in Fig. 13. Even though the lock rod is tilted, the fixed tooth 35, is still maintained in engagement with the lock bar and the parts are retained in this relation until the carriage, is finally stopped at the predetermined writing point. In the rebound movement of the carriage, after the lug 27, passes from the slot 22, the roller 32, leaves the track 31, and is held suspended above the cam 30, and in position to be lowered in operative relation, as best shown in Fig. 13. This action is due to the lug 26, holding the projection 27, a condition which must be maintained until the carriage is finally stopped at the predetermined position.

By this means the carriage, even though it has rebounded past the proposed predetermined writing point in contra letter feed direction, is still locked out of the influence of the motor spring, although the operator may have released the tabulator key and the tabulator stop may be retracted.

In the rebound movement, the extension on the bracket 9, will engage the pin 37 and compress the spring 38, this movement being within, or less than a letter space, and then the bushing or fixed stop 36 is encountered, whereupon movement of the carriage to the left beyond the predetermined position ceases, as shown in Fig. 13. In the rebound movement of the carriage to the left past the predetermined writing point, the function of the buffer spring ceases, any undue shock when the fixed stop is encountered having been absorbed by the dash pot. The rebound movement of the carriage having ceased, the spring 38 will act to move the carriage to the right, and promptly the lug 26 reaches the edge of the projection 27, and contacts with the edge of the sleeve 21, the lock rod 20, is free to be rocked by its spring 28, to normal position, and frees the teeth 34 from the fixed tooth 35. Once the lock rod is free of the tooth, the parts assume their normal positions, and the carriage and the safety mechanism carried thereby are within the control of the motor spring, but this cannot possibly occur after the impact of the stops, until the carriage is finally located at the predetermined point.

It must be borne in mind that in the rebound movement of the carriage the projection 27 passed from the slot 22, the lock rod and the sleeve rotated slightly, consequently the edge of the sleeve was brought into the path of the lug 26, and the latter in its movement to the right by the spring 38, cannot again enter the slot 22, thus the operator is assured of the carriage being stopped at the predetermined writing point.

It does not follow from the above description, that every time a tabulating key is operated that the carriage will come against the positive stop. On the contrary this is an extreme movement. It is true however that whenever the run be sufficient to produce a rebound that will cause the lug 26 to overlie the projection 27, the action of the lock bar, with reference to the fixed tooth will be the same, and the parts will be locked absolutely until the carriage finds the predetermined point.

Now let it be assumed that the run of the carriage was short, the action of the sleeve, the lug and the cam will be the same as heretofore described, but as the impact was lighter, the buffer will not rebound the carriage to the same extent, therefore the lug 26, will be withdrawn from the slot 22, and it may stop at the edge of the sleeve in registry with the seat 21ª, formed between the sleeve 21 and the projection 27. Under such circumstances the spring 28, will immediately rock the lock rod and release the teeth thereof from the fixed tooth on the frame. In this case there would be no rebound past the writing point, and consequently no operation of that part of the lock to the left of the writing point. From this it will be seen that that portion of the lock which is to the left of the writing point is brought into operation only when there is rebound on that side of the writing point, and that this action is automatic.

From the foregoing description it will be seen that the tabulator has not been locked out, nor has it been in any way affected by the mechanism for stopping the carriage at a predetermined point. Once the tabulator key has been depressed and the stops have collided, the operator may or may not remove pressure on the tabulator key, as the parts are so arranged that while the buffer action is going on the sleeve acts to lock the lock rod to the frame of the machine, while during the rebound period past the predetermined writing point the stepped escapement acts to hold the lock rod to the frame, as described.

Because of the parts acting so quickly it is a physical impossibility for the operator to remove pressure on the tabulator key and for the typewriter escapement feed to return to normal position between the time of the impact of the stops and the time the carriage has reached the limit of its movement to the right against the action of the buffer. For this reason it is not necessary to provide means for locking out the tabulator and the escapement feed of the typewriter during the compression of the buffer, and it is of course not necessary to lock out the parts mentioned during the expansion period of the buffer because the typewriter escapement feed at all times yields in that direction and allows the carriage to ride freely to the right.

Particular emphasis is to be placed on the fact that the buffer is wholly independent of the motor spring, and that the latter is attached directly to the stop bar, which permits of the use of a much lighter spring or buffer than heretofore employed, which results in less shock to the parts, and less noise. It is of course understood that the motor spring of the typewriter may be left attached to the carriage, in the usual manner, and my device will be equally efficient except for the greater shock, resultant noise, and greater period of time necessary for the carriage to subside from vibration.

What I claim is:—

1. The combination with a typewriter comprising a movable carriage, a motor spring and step by step spacing mechanism, of buffer mechanism for gradually stopping the carriage and returning the same to a predetermined point, said mechanism including means for freeing the carriage from the influence of the motor spring, and a locking out device for maintaining the buffer mechanism in operative position until such point is reached.

2. In combination, a typewriter comprising a movable carriage having a stop, a motor spring therefor, and a step by step spacing mechanism, a tabulator including a stop, and buffer mechanism for gradually stopping the carriage at a predetermined point independently of the motor spring.

3. In combination, a typewriter comprising a movable carriage having a stop, a motor spring therefor and step by step spacing mechanism, a tabulator including a stop, and buffer mechanism weaker than the motor spring for gradually stopping the carriage at a predetermined point independently of the motor spring.

4. The combination with a typewriter comprising a movable carriage, a motor spring and step by step spacing mechanism, buffer mechanism for gradually stopping the carriage and returning same without interference from the motor spring to a predetermined point, and a locking out device for maintaining the buffer mechanism in operative position until such point is reached, said locking out device including a locking bar to which the motor spring is attached.

5. In combination, a typewriter comprising a movable carriage having stop mechanism, a motor spring acting directly on the carriage stop mechanism, step by step spacing mechanism, a tabulator including a stop, and buffer mechanism for gradually stopping the carriage at a predetermined point independently of the motor spring.

6. In a selective stop mechanism for typewriter carriages, the combination with a frame, a carriage, a motor spring and spacing mechanism, of a stopping member, a buffer device comprising a series of plungers, mechanism for actuating said plungers to interpose the same in the path of movement of said stopping member, and a locking out device for maintaining a connection between the stopping member and the frame of the typewriter.

7. In a tabulating attachment for typewriting machines, the combination with a buffer for the carriage to gradually stop the same in letter feed direction, of means for permitting of the escapement mechanism of the typewriter assuming normal position when the carriage is moved in contra-letter feed direction after a perdetermined point has been reached by the carriage in skipping in letter feed direction, and means for automatically entirely restoring the letter feed by a step by step movement when the carriage finally stops at the predetermined point.

8. In a typewriting machine, the combination with a movable carriage, of motor mechanism and step by step spacing mechanism therefor, a tabulator stop, a tabulator key for releasing the step by step spacing mechanism and permitting the carriage to be moved freely and automatically by said motor mechanism until said tabulating stop is engaged by said carriage and while said key remains depressed, a cushion to relieve the impact of the carriage after said tabulating stop is engaged, means for automatically locking out the motor mechanism, said locking means acting independently of the tabulator key after the impact, the step by step spacing mechanism being reconnected to feed in letter feed direction only after the carriage reaches a predetermined point.

9. The combination with a typewriting machine, with tabulator mechanism therefor comprising a cushion to relieve the force of the impact of the carriage when the latter is arrested, a carriage, motor mechanism therefor, a locking device to lock out the motor mechanism and which automatically remains in continuously locked condition during the compression and expansion of said cushion, and means for thereafter automatically unlocking said locking device at or about the time the carriage passes out of control of the tabulating mechanism.

10. The combination with a typewriting machine, of tabulating mechanism comprising stops on the typewriter frame and the carriage respectively which are adapted to coöperate with each other to arrest the carriage, a cushion to relieve the impact of the carriage when said stops engage, and safety mechanism for taking the carriage out of the control of its escapement and out of the control of the tabulator mechanism and locking it in such condition after the carriage has passed the point of impact and until it returns thereto, and means to permit restoration of the control of the carriage to the escapement feed when the carriage stops at said impact point upon its return thereto.

11. In a tabulating typewriting machine, the combination of a tabulator including a key, a typewriter carriage, a buffer therefor, and means for positively limiting the rebound of the carriage, said means including a stop fixed with respect to the typewriter frame and which continues in operative relation with respect to the carriage after finger pressure has been removed from the tabulator key.

12. In a tabulating typewriter, the combination with a carriage buffer, and a lock operating during the rebound and which is automatically held in operative position whenever the carriage rebounds beyond the predetermined position.

13. In a tabulating typewriter, the combination of a carriage buffer, and a lock limiting the rebound and which is automatically held in locked position whenever the carriage rebounds beyond the predetermined position and which automatically returns to normal position only when such rebound has subsided.

14. In a tabulating typewriter, the combination of a tabulating mechanism, of a typewriter carriage and a buffer for the carriage, and a lock limiting the rebound and brought into operation by the rebound of the carriage.

15. In a tabulating typewriting machine, the combination with a movable carriage, of motor mechanism therefor, stop mechanism including stops, a cushion for relieving the impact of the stops when the stop mechanism is operated, means for automatically locking out the motor mechanism when a predetermined point is reached and so maintaining same until the carriage returns to said point, said means co-acting with the stop mechanism.

16. In a tabulating typewriting machine, the combination with a movable carriage, of motor mechanism therefor, stop mechanism including stops, a cushion for relieving the impact of the stops when the stop mechanism is operated, and means which comes into action when the carriage is stopped by said stop mechanism and continues until the carriage is returned by the cushion to the point of impact to automatically lock out the motor mechanism.

17. In a tabulating attachment for typewriters, the combination with a movable carriage, of tabulating mechanism including stop apparatus, a cushion for relieving the force of the impact of the carriage when the stop apparatus is operated, the tabulating mechanism causing the letter feed mechanism of the typewriter to be inoperative until after a predetermined stopping point is reached, the tabulating mechanism being meanwhile free to return to its normal position at any time after the impact of the carriage.

18. In a tabulating attachment for typewriters, the combination with a movable carriage, motor mechanism therefor, of tabulating mechanism including a key and stop apparatus, a cushion for relieving the force of the impact of the carriage when the stop apparatus is operated, the tabulating mechanism holding the letter feed mechanism of the typewriter in inoperative position only so long as finger pressure is maintained upon the tabulator key, a locking out device to lock out the motor mechanism and which operates only during the repellent action of the cushion and the resultant continued rebound.

19. In a tabulator attachment for typewriting machines, the combination of means for disconnecting the feed mechanism of a typewriter and permitting the carriage to skip toward a predetermined point, of resilient buffer mechanism for stopping the carriage and returning it to such predetermined point, means for automatically locking out the motor mechanism of the typewriter during the gradual stopping and return of said carriage, and means permitting automatic restoration of the letter feed mechanism at such predetermined point.

20. In a tabulator attachment for typewriting machines, the combination with means for disconnecting the feed mechanism of a typewriter and permitting the carriage to skip toward a predetermined point, of resilient buffer mechanism for stopping the carriage and returning it to such predetermined point, means which causes the motor mechanism of the typewriter to become locked out whenever the carriage is under control of the buffer mechanism.

21. The combination with a typewriting machine, comprising escapement feed and a carriage, of tabulating mechanism comprising stops on the carriage and the typewriter frame respectively which collide with each other to arrest the carriage when the escapement feed is released, motor mechanism controlling the stop on the carriage, a cushion to relieve the impact of the carriage when the stops collide, and safety mechanism for locking the carriage out of the control of the motor mechanism from the time of the collision of said stops and while the carriage is moving forward and returning until the carriage rests momentarily in a predetermined position.

22. The combination with a typewriting machine comprising a frame, a carriage and escapement feed, of tabulating mechanism comprising stops on the typewriter frame and carriage respectively, a motor spring for the carriage attached to the stop on the typewriter frame, means for releasing the escapement feed and causing the carriage to skip in letter feed direction until said stops collide, a cushion to relieve the impact of the carriage when the stops collide, and safety mechanism for locking the carriage out of the control of the motor mechanism during the compression of said cushion.

23. In a tabulating attachment for typewriting machines, the combination with a movable carriage and motor mechanism therefor, of stop apparatus, a cushion for relieving the force of impact of the carriage when the stop apparatus is operated, and means for automatically locking out the motor mechanism when a predetermined stopping point is reached.

24. In a tabulating attachment for typewriting machines, the combination with a movable carriage, motor mechanism therefor, of stop apparatus, a cushion for relieving the force of the impact of the carriage when the stop apparatus is operated, means for automatically locking out the motor mechanism of the typewriter and so maintaining the same until the carriage be returned to a predetermined point by said cushion.

25. In a typewriting machine, the combination of a typewriter carriage, motor mechanism therefor, means for releasing the step by step feed of the typewriter, coöperating stops on the typewriter frame and on the carriage respectively, one of which is adapted to be projected into the path of the other to arrest the carriage, a cushion to relieve the force of the impact of the carriage when said stops collide, a locking out device coöperating with said stops, said locking out device including a stepped escapement for gradually restoring the said step by step feed at a predetermined point, and connections which operate to lock out the motor mechanism of the typewriter whenever the tabulator carriage is arrested by said stops.

26. In a typewriting machine, the combination with a movable carriage, a motor spring, of stop mechanism, step by step spacing mechanism, means for disconnecting the step by step mechanism to permit the carriage to skip and engage said stop mechanism, means for cushioning the impact of the carriage against said stop mechanism, means for absorbing the recoil of the carriage past the predetermined writing point in contra-letter feed direction, and automatic mechanism for locking the carriage out of control of its motor spring until said carriage comes to rest at the position designated by the stop mechanism.

27. The combination of a typewriting machine comprising escapement feed and a carriage, of tabulating mechanism comprising stops on the carriage and typewriter frame respectively, which collide with each other to arrest the carriage when the escapement feed is released, a cushion to relieve the impact of the carriage when the stops collide, safety mechanism for locking the carriage out of the control of its escapement feed from the time of the collision of said stops and while the carriage is moving forward and returning until the carriage rests momentarily in a predetermined position, and means for automatically unlocking the safety mechanism and restoring the carriage to full control of its escapement feed.

28. The combination with a typewriting machine, comprising a carriage, motor mechanism therefor, escapement feed mechanism, tabulating mechanism comprising stops on the carriage and the typewriter frame respectively which collide with each other to arrest the carriage when the escapement feed is released, a cushion to relieve the impact of the carriage when the stops collide, safety mechanism for locking the carriage out of the control of the escapement feed after the time of the collision of said stops and while the carriage is moving forward until the carriage rests momentarily in a predetermined position, including connections which cause the motor mechanism of the typewriter to become inoperative at the time of the collision of the stops.

29. In a tabulating typewriter, the combination of tabulating mechanism including a stop and a tabulating key, a carriage, a stop on the carriage, motor mechanism for the carriage, escapement mechanism, a buffer, lock-out mechanism which acts both sides of a predetermined stopping point of the carriage, the typewriter escapement being under the control of the tabulating key.

30. In a tabulating typewriter, the combination of tabulating mechanism including a stop and a tabulating key, a carriage, a stop on the carriage, motor mechanism for the carriage, escapement mechanism, a buffer, lock out mechanism which acts both sides of a predetermined point of a stopping point of the carriage, said lock out mechanism including means for fixing a part of the mechanism to the frame of the typewriter, the typewriter escapement being under the control of the tabulating key.

31. In a tabulating typewriter, the combination of tabulating mechanism including a stop and a tabulating key, a carriage, a stop on the carriage, motor mechanism for the carriage, escapement mechanism, a buffer, and lock nut mechanism acting both sides of a predetermined stopping point of the carriage including a stepped escapement, and means to lock a part of said mechanism to the typewriter frame, the typewriter escapement being under the control of the tabulator key.

32. In a tabulating typewriter, the combination of a tabulator including a stop, a freely movable carriage including a stop, a buffer for the carriage, a rebound lock which includes a fixed element on the frame, said lock being operated by impact of the stops and remaining in locked relation with the frame until the carriage finally reaches a predetermined writing point after having passed said writing point by the rebound of the buffer.

33. In a tabulating typewriter, the combination of a tabulator including a stop and a tabulating key, a carriage including a stop, said carriage having free movement in both directions with reference to a predetermined point, means for cushioning the carriage when it moves in either direction beyond a predetermined point, a fixed stop for limiting the movement in letter feed direction, and a lock out device which releases the carriage only when it finally reaches its predetermined writing position.

34. In a tabulating typewriter, the combination of a tabulator including a stop, a carriage having a stop, cushion means to absorb the shock when the stops collide; said cushion mean including several elements each varying in resistance, and means coöperating with the cushion means to cause the carriage to stop at a predetermined writing point.

35. In a tabulating typewriter, the combination of a tabulator including a stop, a carriage having a stop, a cushion to absorb the shock when the stops collide, a rebound lock brought into operation by the rebound of the carriage, a motor spring for operating the carriage, and means actuated by the lock for suspending the action of the motor spring from the time of the impact of the stops until the carriage finally reaches a predetermined writing point.

36. In a tabulating typewriter, the combination of a tabulator including a stop, a carriage including a stop, a buffer for the carriage, and a lock operating during the rebound including a stepped escapement and a positive stop, said lock being brought into operation by the rebound of the carriage.

37. In a tabulating typewriter, the combination of a tabulator including a stop, a carriage including a stop, a buffer for the carriage, a lock including a part fixed to the frame of the typewriter and a part which moves with the carriage, and a fixed stop to limit the movement of the carriage in letter feed direction, the lock being brought into operation by the impact of the stops and held in operative relation until the carriage finally reaches a predetermined position.

38. In a tabulating typewriter, the combination of tabulating mechanism including a stop and a tabulating key, a carriage, a stop on the carriage, motor mechanism for the carriage, escapement mechanism to lock out the motor mechanism, a buffer, lock-out mechanism which acts both sides of a predetermined stopping point of the carriage.

39. In a tabulating typewriter, the combination of tabulating mechanism including a stop and a tabulating key, a carriage, a stop on the carriage, motor mechanism for the carriage, escapement mechanism to lock out the motor mechanism, a buffer, lock out mechanism which acts both sides of a predetermined stopping point of the carriage, said lock-out mechanism including means for fixing a part of the mechanism to the frame of the typewriter.

40. In a tabulating typewriter, the combination of tabulating mechanism including a stop and a tabulating key, a carriage, a stop on the carriage, motor mechanism for the carriage, escapement mechanism, a buffer, and lock out mechanism to lock out the motor mechanism acting both sides of a predetermined stopping point of the carriage including a stepped escapement, and means to lock a part of said mechanism to the typewriter frame.

41. A detachable tabulating attachment for typewriters to permit free vibrating of a typewriter carriage in letter feed and contra letter feed directions past a predetermined writing point, comprising buffers to receive the shocks of the carriage in both directions, and a locking device operating while the carriage is vibrating both sides of the predetermined writing point and which is only released and connected to move with the carriage when said carriage finally settles at said predetermined writing point.

42. In a tabulating typewriter, the combination of a tabulator including a stop, a carriage including a stop, a buffer for the carriage, and a lock operating during the rebound including a positive stop, said lock being brought into operation by the rebound of the carriage.

In testimony whereof I affix my signature in the presence of two witnesses.

FRED P. GORIN.

Witnesses:
 JOHN IMIRIE,
 F. M. MEYER.